H. R. DAVIES.
AUTOMATIC REGULATOR.
APPLICATION FILED MAY 13, 1918.
1,346,181.
Patented July 13, 1920.
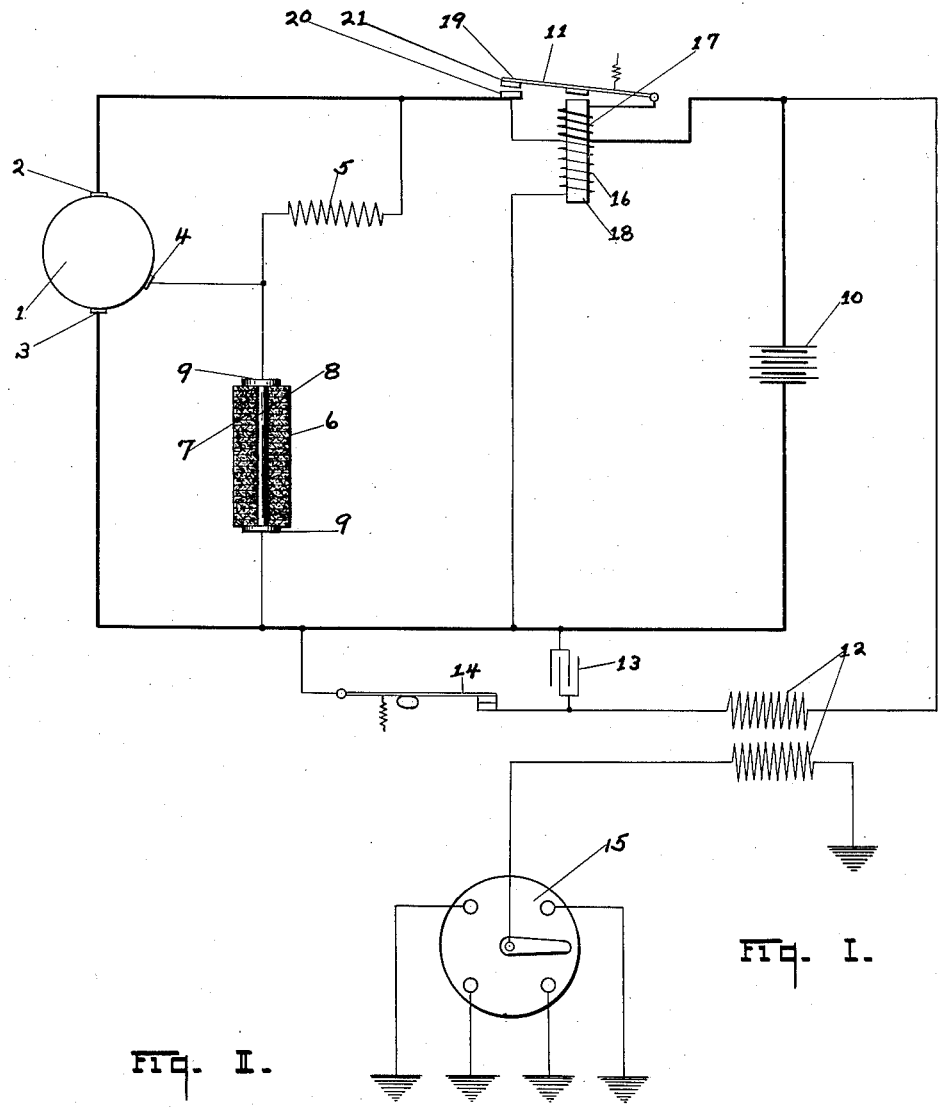
Fig. I.
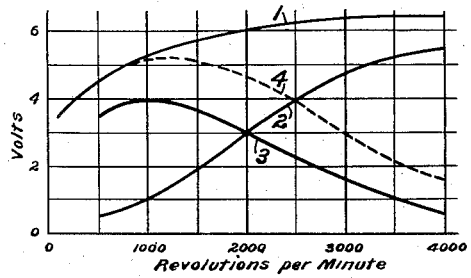
Fig. II.
Inventor
Henry R. Davies
By Chester H Braselton
Attorney

UNITED STATES PATENT OFFICE.

HENRY R. DAVIES, OF TOLEDO, OHIO, ASSIGNOR TO INDUSTRIAL RESEARCH CORPORATION, OF TOLEDO, OHIO, A CORPORATION OF DELAWARE.

AUTOMATIC REGULATOR.

1,346,181.  Specification of Letters Patent.  Patented July 13, 1920.

Application filed May 13, 1918. Serial No. 234,284.

*To all whom it may concern:*

Be it known that I, HENRY R. DAVIES, a citizen of the United States, residing at Toledo, in the county of Lucas and State of Ohio, have invented certain new and useful Improvements in Automatic Regulators, of which I declare the following to be a full, clear, and exact description.

This invention relates to a type of automatic regulator for variable speed dynamo electric machines, particularly as applied to charging and lighting systems for automobiles.

The principal object of this invention is to provide means connected to a variable speed generator for decreasing the current in the field windings when the speed of the machine exceeds a certain pre-determined limit.

Another object of the invention is to provide a type of current control which will maintain the voltage of the machine at an approximately constant value within a certain range of speed above which the voltage decreases so that an approximately constant charging current may be obtained at the average speeds of the automobile.

Still another object is to employ a type of regulator which is exceedingly compact in size and strong in construction.

Further objects, and objects relating to economies of manufacture and details of construction, will definitely appear from the detailed description to follow.

I accomplish the objects of my invention by the devices and arrangement described in the following specification. My invention is clearly defined and pointed out in the appended claims.

A structure constituting a preferred embodiment of my invention is illustrated in the accompanying drawings, forming a part of this specification, in which:

Figure I is a diagrammatic view of the invention, and,

Fig. II illustrates the various curve characteristics of different types of machines.

In charging and lighting systems commonly employed on automobiles, a system of regulation employing a third brush in conjunction with the two main brushes of the generator is used, wherein the shunt field is connected to one main brush and to the third brush. This type of regulation causes a decrease in the voltage of the generator when the speed of the machine rises to a certain point where the armature reactions become effective, when a decrease of voltage results, the decrease depending on the speed of rotation of the armature. A curve 3 illustrating this variation of voltage with speed is indicated in Figure II of the drawing. A disadvantage of this form of regulation resides in the fact, as evidenced by curve 3 of Fig. II, that the range of speed variation where the voltage is maintained at approximately the same value, is somewhat limited.

In order to maintain the voltage at the normal charging value for ordinary speeds, I utilize a generator 1 of the "third brush" type, having main brushes 2 and 3, and a third or auxiliary brush 4. To the main brush 2 and third brush 4, a shunt field 5 is connected, and to the main brush 3 and third brush 4, a regulating device 6 is connected. The regulating device 6, in the form employed, consists of a series of carbon disks 7 which are apertured and placed over a connecting rod 8, and the whole firmly held in place by terminal washers 9 attached to the ends of the rod. The rod 8 is made of metal having a comparatively high co-efficient of expansion, and is connected in series with the electrical circuit intermediate the brushes 3 and 4.

As illustrated, the generator supplies current to the storage battery 10, through an automatic switch 11, and also to an ignition system comprising induction coils 12, condenser 13, interrupter 14, and distributer 15. The automatic switch 11 is in the form of a relay or cut-out having a shunt winding 16 and series winding 17, which are coiled about a core 18, and are adapted to operate the armature 19 to open and close the contacts 20 and 21.

As is evident from the description above, the field for low speeds operates as a plain shunt field, having a characteristic voltage curve in speed variation similar to that indicated by curve 1 of Fig. II. The voltage is in excess of that which would ordinarily result if the regulator circuit were open, inasmuch as the terminal voltage of the main brushes 2 and 3 of the machine is applied directly to the field, and in consequence, a high initial exciting current is attained for the lower speeds. As the speed of rotation increases, the voltage increases, tending to send more current through the regulator 6, and since the voltage between the brushes 3 and 4 increases approximately as the speed, as indicated in curve 2 of Fig. II, the heating effect and consequent linear expansion of the rod 8 of the regulator 6 increases. This results in a decrease of pressure of the carbon disks in the regulator, and an increase of resistance to the passage of current, thereby tending to force the current through the armature windings intermediate the brushes 3 and 4, and permitting the machine to function as an ordinary third brush generator. As the heating effect is gradual, the shifting of the machine from one having shunt field characteristics to one having third brush characteristics is also gradual, the curve taking a form similar to that indicated by the dotted line 4 of Fig. II, in which the maintenance of an approximation of the most desirable charging voltage through wide speed variations is apparent.

It should be noted that the regulator 6 affords a passageway for current through both the connecting rod 8 and the carbon disks 7, so that the effect of the expansion of the rod 8 is to nullify to a large extent, the conductivity of the carbon portion of the conductor, which in turn, tends to force more current through the rod 8, increasing to a still greater extent, its expansion and its resistance, due to heating effects.

Although the heating of the carbon disks, due to the passage of current and to conduction from the rod 8 decreases their resistance, yet this decrease is so small in comparison with the increase of resistance caused by the loosened contact between the disks, as to be virtually negligible.

While it is desirable that a storage battery be floated upon the line, in order to form a load of low resistance and opposing voltage for balancing the voltage fluctuations, this type of regulation may be used independent of the storage battery, with satisfactory results.

I am aware that this particular embodiment of my invention is susceptible of considerable variation without departing from the spirit thereof, and, therefore, I desire to claim the same broadly, as well as specifically, as indicated by the appended claims.

Having thus described my invention, what I claim as new and desire to secure by Letters Patent, is:

1. In a system of control for variable speed dynamo electric machines, the combination of an electric generator; power mains connected to said generator; translating devices including a storage battery connected across the mains; said generator having field poles, an armature, main brushes bearing on the armature, an auxiliary brush bearing on the armature, a shunt field winding connected to one of said main brushes and to the auxiliary brush, in which the voltage decreases as the speed increases; and means connected intermediate the auxiliary brush and the other main brush and automatically operative in response to the amount of current flowing therethrough to decrease the gradient of normal decrease of voltage in the shunt field at lower speeds, and to increase the gradient of normal decrease of shunt field voltage at higher speeds.

2. In a system of control for variable speed dynamo electric machines, the combination of an electric generator; power mains connected to said generator; translating devices including a storage battery connected across the mains, said generator having field poles, an armature, main brushes bearing on the armature, and auxiliary brush bearing on the armature, a shunt field winding connected to one of said main brushes and to the auxiliary brush, in which the voltage decreases as the speed increases; and means connected intermediate the auxiliary brush and the other main brush and automatically operative in response to the amount of current flowing therethrough to decrease the gradient of normal decrease of voltage in the shunt field at lower speeds.

3. In a system of control for variable speed dynamo electric machines, the combination of an electric generator; power mains connected to said generator; translating devices including a storage battery connected across the mains; said generator having field poles, an armature, main brushes bearing on the armature, an auxiliary brush bearing on the armature, a shunt field winding connected to one of said main brushes and to the auxiliary brush, in which the voltage decreases as the speed increases; and means connected intermediate the auxiliary brush and the other main brush, automatically operative in response to the amount of current flowing therethrough to increase the gradient of normal decrease of shunt field voltage at the higher speeds.

4. In a system of control for variable speed dynamo electric machines, the combination of an electric generator; power mains connected to said generator; translating devices including a storage battery connected across the mains; said generator having field poles, an armature, main brushes bearing on the armature, an auxiliary brush bearing on the armature, a shunt field winding connected to one of said main brushes and to the auxiliary brush, in which the voltage decreases as the speed increases; and means including a resistance element responsive to current variations; connected intermediate the auxiliary brush and the other main brush and automatically operative to decrease the gradient of normal decrease of voltage in the shunt field at lower speeds, and to increase the gradient of normal decrease of shunt field voltage at higher speeds.

5. In a system of control for variable speed dynamo electric machines, the combination of an electric generator; power mains connected to said generator; translating devices including a storage battery connected across the mains, said generator having field poles, an armature, main brushes bearing on the armature, an auxiliary brush bearing on the armature, a shunt field winding connected to one of said main brushes and to the auxiliary brush; in which the voltage decreases as the speed increases; and means including a resistance element responsive to current variations connected intermediate the auxiliary brush and the other main brush and automatically operative to decrease the gradient of normal decrease of voltage in the shunt field at lower speeds.

6. In a system of control for variable speed dynamo electric machines, the combination of an electric generator; power mains connected to said generator; translating devices including a storage battery connected across the mains; said generator having field poles, an armature, main brushes bearing on the armature, an auxiliary brush bearing on the armature, a shunt field winding connected to one of said main brushes and to the auxiliary brush, in which the voltage decreases as the speed increases; and means including a resistance element responsive to current variations connected intermediate the auxiliary brush and the other main brush automatically operative to increase the gradient of normal decrease of shunt field voltage at the higher speeds.

7. In a system of control for variable speed dynamo electric machines, the combination of an electric generator; power mains connected to said generator; translating devices including a storage battery connected across the mains; said generator having field poles, an armature, main brushes bearing on the armature, an auxiliary brush bearing on the armature, a shunt field winding connected to one of said brushes and to the auxiliary brush, in which the voltage decreases as the speed increases; a carbon pile consisting of a central rod having a high coefficient of expansion connected intermediate the auxiliary brush and the other main brush, said rod being provided with heads at its end, centrally perforated carbon disks mounted upon said rod between the heads thereof, the parts being so proportioned that the rod heads exert heavy pressure upon the disks at normal temperature, which pressure is relieved as the temperature of the rod rises.

8. In a system of control for variable speed dynamo electric machines, the combination of an electric generator; power mains connected to said generator; translating devices including a storage battery connected across the mains, said generator having field poles, an armature, main brushes bearing on the armature, an auxiliary brush bearing on the armature, a shunt field winding connected to one of said main brushes and to the auxiliary brush, in which the voltage decreases as the speed increases; and a variable resistance connected intermediate the auxiliary brush and the other main brush, said resistance being arranged to decrease upon the passage therethrough of a decreasing current, thereby acting to decrease the gradient of normal decrease of voltage in the shunt field at lower speeds.

9. In a system of control for variable speed dynamo electric machines, the combination of an electric generator; power mains connected to said generator; translating devices including a storage battery connected across the mains; said generator having field poles, an armature, main brushes bearing on the armature, an auxiliary brush bearing on the armature, a shunt field winding connected to one of said main brushes and to the auxiliary brush, in which the voltage decreases as the speed increases; and a variable resistance connected intermediate the auxiliary brush and the other main brush, said resistance being arranged to increase automatically upon the passage therethrough of increasing current, thereby acting to increase the gradient of normal decrease of voltage in the shunt field at higher speeds.

In testimony whereof, I affix my signature.

HENRY R. DAVIES.